United States Patent [19]

Jordan

[11] Patent Number: 4,754,991
[45] Date of Patent: Jul. 5, 1988

[54] METHOD AND BUFFER APPARATUS FOR PREVENTING CORROSION IN DYNAMIC LOAD BEARING ASSEMBLY

[76] Inventor: Robert O. Jordan, 2619 North Scottsdale Rd., Scottsdale, Ariz. 85257

[21] Appl. No.: 903,258

[22] Filed: Sep. 3, 1986

[51] Int. Cl.⁴ .......................................... B62D 17/00
[52] U.S. Cl. .................................. 280/661; 267/293; 403/224
[58] Field of Search .............. 280/661, 666, 670, 673, 280/696, 701; 403/224, 14, 225, 227, 228, 226, 261; 267/292, 293, 141, 153; 248/412, 635

[56] References Cited

U.S. PATENT DOCUMENTS

| | | | |
|---|---|---|---|
| 2,787,486 | 4/1957 | Thiry | 403/224 |
| 3,013,643 | 12/1961 | Perry | 403/224 |
| 3,823,833 | 7/1974 | Chung | 267/63 R |
| 4,002,327 | 1/1977 | Damon | 267/63 A |
| 4,026,578 | 5/1977 | Mattson | 280/661 |
| 4,557,501 | 10/1985 | Farleigh | 267/63 R |
| 4,616,845 | 10/1986 | Pettibone | 280/661 |
| 4,619,465 | 10/1986 | Johnson | 280/661 |

Primary Examiner—John J. Love
Assistant Examiner—Karin L. Ferriter
Attorney, Agent, or Firm—Nissle & Leeds

[57] ABSTRACT

A method and buffer apparatus for preventing corrosion in a dynamic load bearing assembly. A resilient buffer material is compressively adjustably positioned between a pair of dynamic adjacent load bearing components in a machine such that the amount of electrical resistance between the load bearing components can be varied without having to disassemble the machine. The buffer material is maintained in position between the load bearing components by compressing the buffer material an amount equal to 5 to 30% of its length to outwardly expand surfaces of the buffer material against the load bearing members.

5 Claims, 3 Drawing Sheets

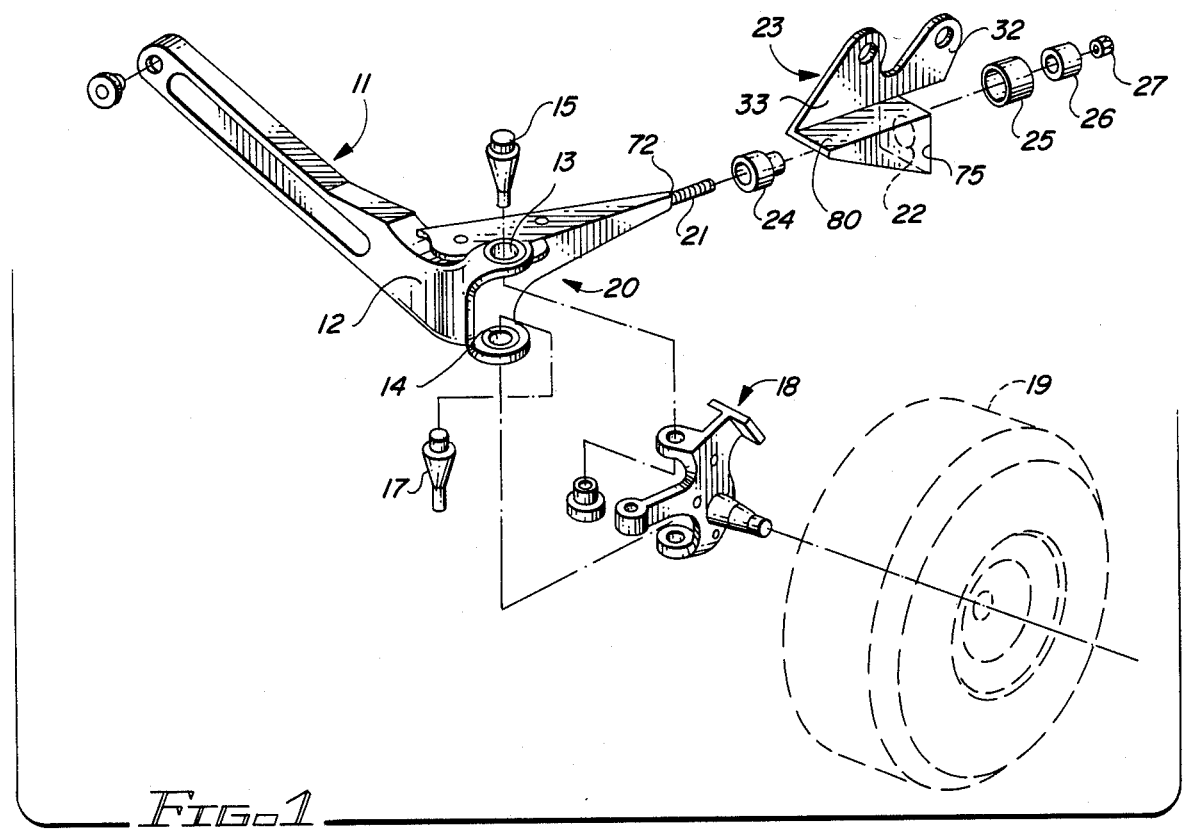
FIG.1 (PRIOR ART)
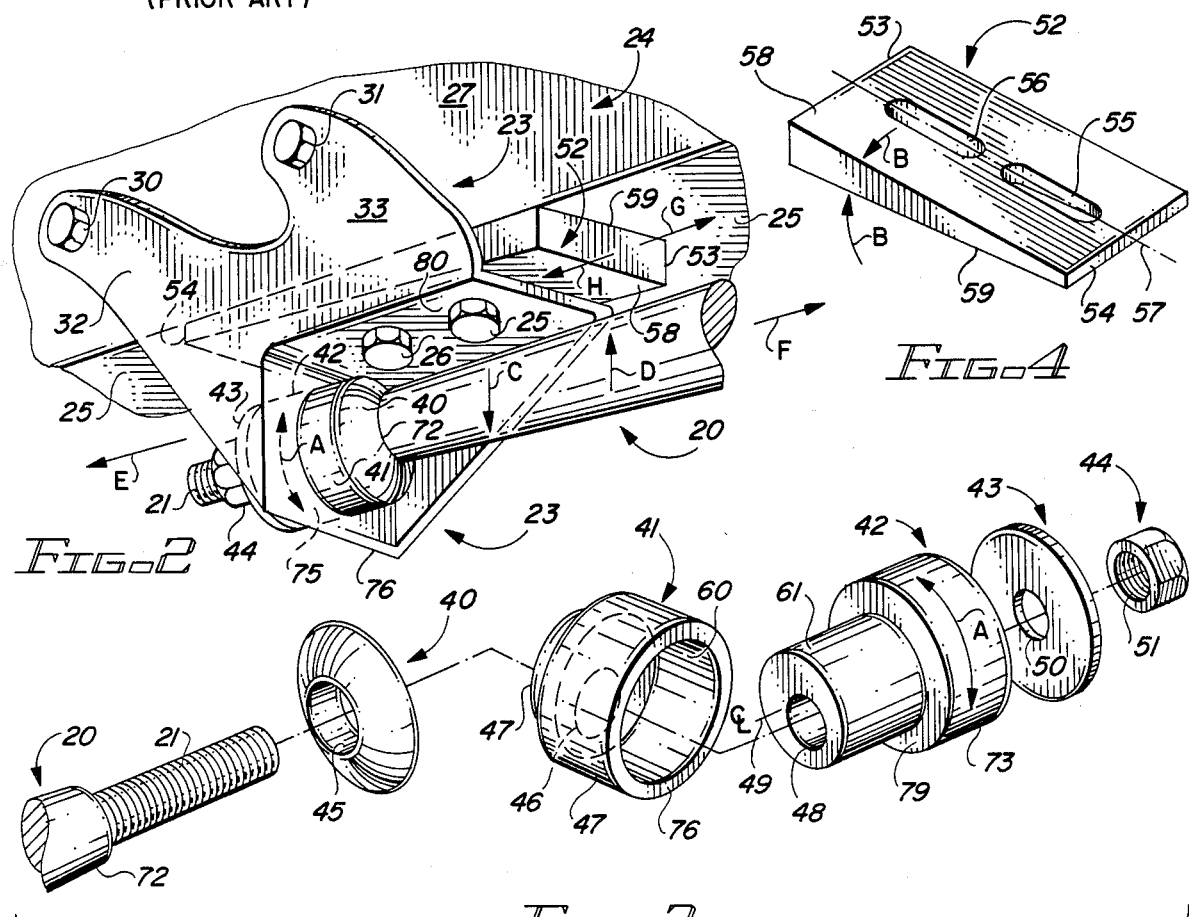
FIG.2
FIG.3
FIG.4

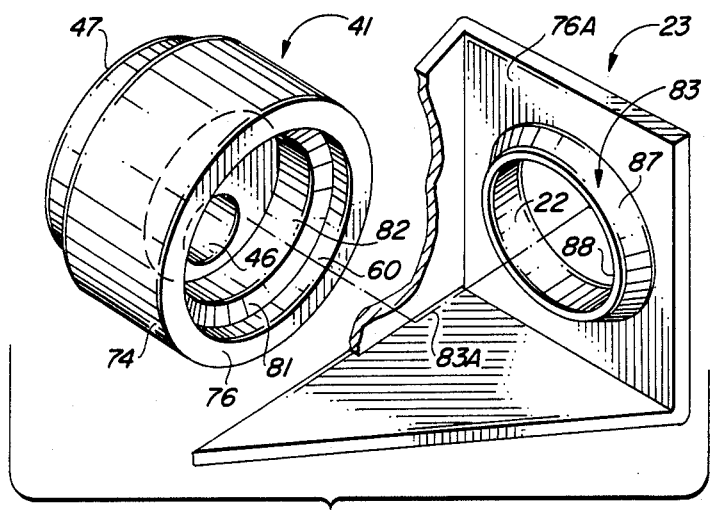
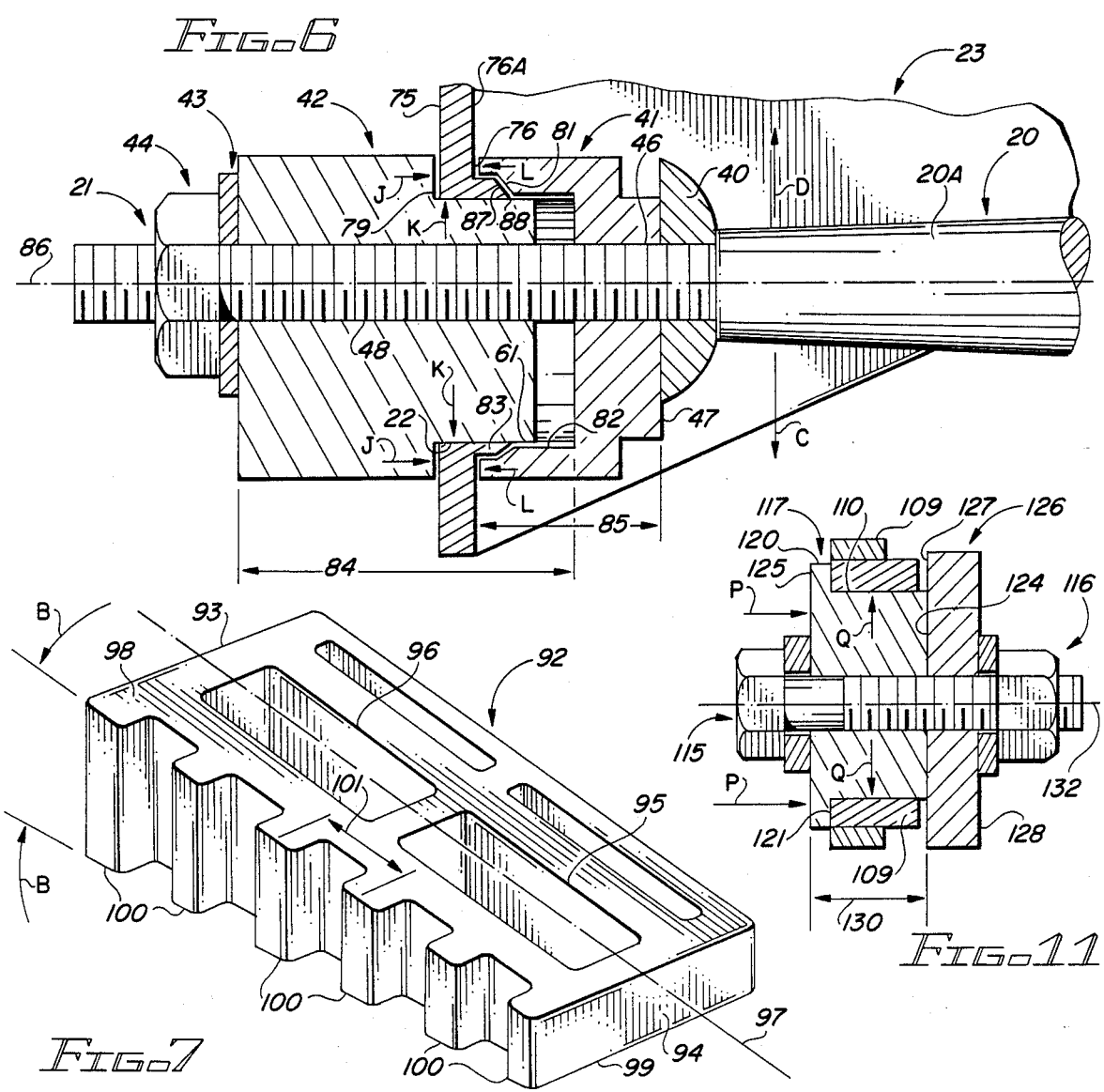

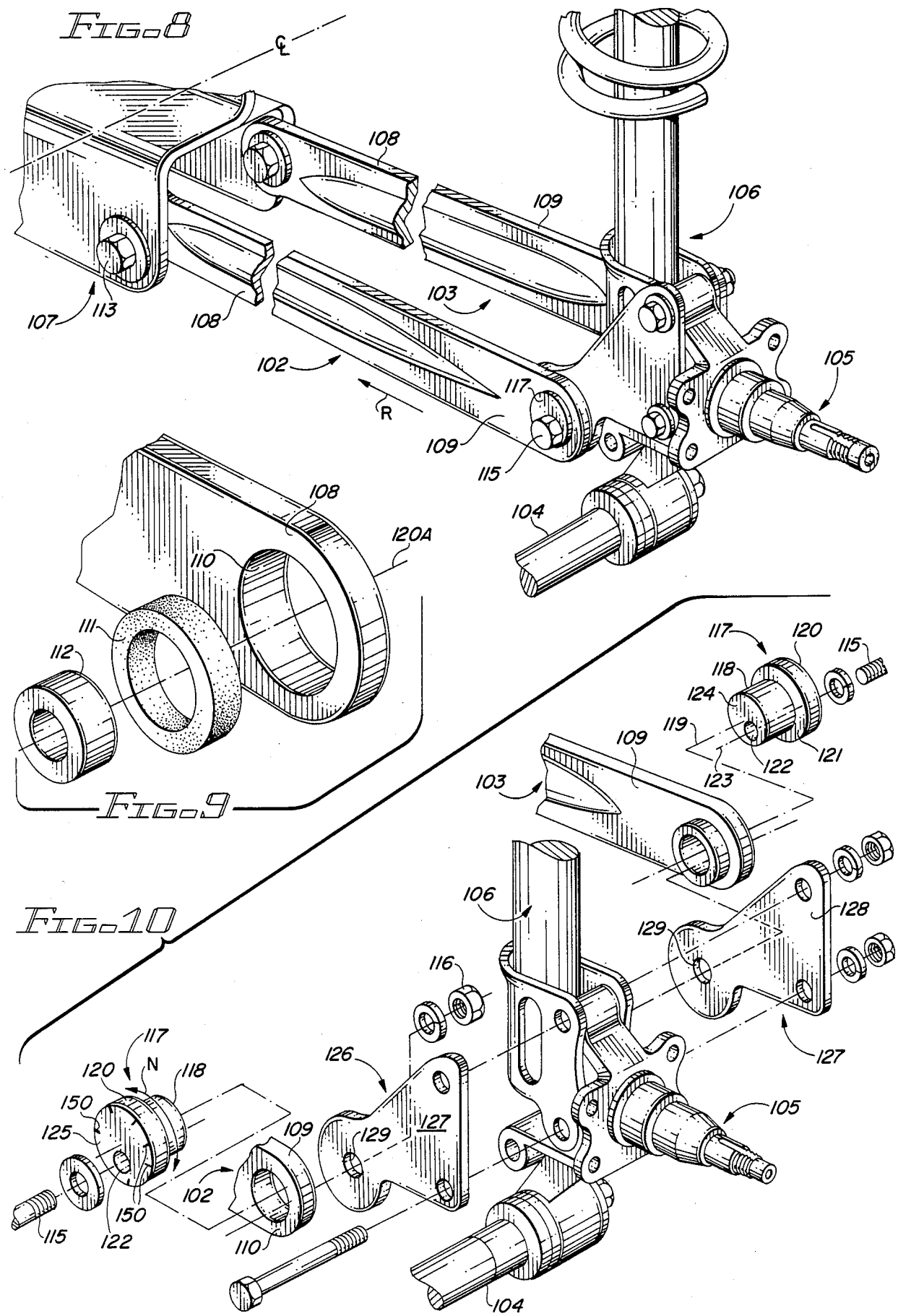

METHOD AND BUFFER APPARATUS FOR PREVENTING CORROSION IN DYNAMIC LOAD BEARING ASSEMBLY

This invention relates to a method and apparatus for preventing the flow of electricity between and corrosion and degradation of a pair of adjacent load bearing components in a machine.

More particularly, the invention relates to a method for compressively adjustably positioning a resilient buffer material which absorbs only small quantities of liquid and has a low electrical conductivity between a pair of dynamic adjacent load bearing components in a machine such that the amount of electrical resistance between the load bearing components can be varied without having to disassemble the machine and separate the components.

In a further aspect, the invention relates to a method for interposing a buffer material between a pair of interconnected load bearing machine components such that the amount of electrical resistance provided by the buffer material between two opposed points each one of the load bearing components can be readily determined from indicia on the load bearing components and on the buffer material.

In another respect, the invention pertains to a method for interposing a resilient buffer member between a pair of dynamic interconnected load bearing members, the position of the load bearing members with respect to one another being adjustable by altering the orientation of the buffer member, the buffer member being maintained in position between the load bearing members by compressing the buffer member an amount equal to 5 to 30% of its length to outwardly expand surfaces of the buffer member against the load bearing members.

Adjacent interconnected load bearing components in a machine are generally susceptible to corrosion and degradation during utilization of the machine. This is especially true when a pair of adjacent components are fabricated from differing metals and are utilized in environments in which water or other fluids can penetrate between the components to promote galvanic and other type of corrosion. Stress placed on the components during operation of the machine often facilitates corrosion and degradation of the components. Since providing adjacent metallic machine components with a protective coating or attempting to seal spaces between the components is often economically impractical, the components are typically permitted to corrode and are, when sufficiently weakened, replaced.

Accordingly, it would be highly desirable to provide an improved method and apparatus for minimizing the degradation and galvanic and other corrosion of adjacent dynamic load bearing components in a machine.

It would also be highly desirable to provide a method of the type described which would readily seal the space between adjacent load bearing machine components to deter the collection of moisture therebetween and which would minimize the flow of electricity between the components during utilization of the machine in conditions under which the components were contacted by water or other corrosion promoting fluids.

Therefore, it is a principal object of the invention to provide an improved method and apparatus for minimizing the degradation and corrosion of pair of adjacent dynamic load bearing components in a machine.

Another object of the invention is to provide a method for minimizing the corrosion of a pair of adjacent load bearing machine components in which spaces between the components are sealed to minimize corrosion thereof.

A further object of the invention is to provide a method of the type described in which spaces between a pair of adjacent load bearing components are sealed with a material which resists absorption of water and other corrosive fluids.

Another object of the invention is to provide a method of the type described in which the flow of electricity between a pair of load bearing machine components is substantially reduced under galvanic corrosion conditions.

Still another object of the instant invention is to provide a method of the type described in which the amount of electrical resistivity between a pair of opposed points each on one of two adjacent load bearing components can be readily adjusted and determined by utilizing interrelated indicia on the load bearing components.

Yet another object of the invention is to provide a method for compressibly interposing a resilient buffer member between a pair of interconnected dynamic load bearing members such that the position of the lead bearing members with respect to one another can be adjusted by altering the orientation of the buffer member, and such that the buffer member can be maintained in position between the load bearing members by compressing the buffer member an amount equal to 5 to 30% of its length to outwardly expand surfaces of the buffer member against the load bearing members.

These and other, further and more specific objects and advantages of the invention will be apparent to those skilled in the art from the following detailed description thereof, taken in conjunction with the drawings, in which:

FIG. 1 is an exploded assembly view illustrating a prior art loading bearing assembly;

FIG. 2 is a perspective view illustrating the load bearing assembly of FIG. 1 equipped with buffer apparatus constructed in accordance with the principles of the invention;

FIG. 3 is an exploded assembly view illustrating buffer apparatus in the load bearing assembly of FIG. 2;

FIG. 4 is a perspective view illustrating buffer apparatus utilized in the load bearing assembly of FIG. 2;

FIG. 5 is a perspective view further illustrating buffer apparatus utilized in the load bearing assembly of FIG. 2;

FIG. 6 is a section view of the load bearing assembly of FIG. 2 further illustrating internal construction details thereof;

FIG. 7 is a perspective view illustrating an alternate embodiment of the buffer apparatus of FIG. 4;

FIG. 8 is a perspective view illustrating another prior art load bearing assembly equipped with buffer apparatus constructed in accordance with the principles of the invention;

FIG. 9 is a perspective assembly view illustrating a prior art load bearing member;

FIG. 10 is an exploded assembly view illustrating the portion of the load bearing apparatus of FIG. 8 constructed in accordance with the invention; and, FIG. 11 is a section view of a portion of the load bearing apparatus of FIG. 1 illustrating the mode of operation thereof.

Briefly, in accordance with my invention, I provide an improved load bearing assembly. The assembly includes a first load bearing member having a plate portion including a front side, a back side opposed to and spaced apart from the front side, and a circular opening extending through the plate portion and spanning the distance between the front and back sides; a second load bearing member; elongate bolt means extending through the circular opening in the first load bearing member and interconnecting the first and second load bearing members, and including an elongate cylindrical member and nut means fixedly removably engaging the elongate cylindrical member; and, resilient buffer means. The resilient buffer means includes a first cylindrical portion slidably rotably inserted in the circular opening and having a centerline parallel to and equidistant from points on the outer cylindrical surface thereof; a second portion attached to the first cylindrical portion and bearing against one of the front and back sides of the plate portion; and, an eccentric cylindrical aperture extending through the first and second portions and having a centerline parallel to the cylindrical surface of the aperture and to the centerline of the cylindrical portion, the elongate cylindrical member of the bolt means being slidably inserted in and extending through the eccentric aperture and outwardly from the second portion of the buffer means. The buffer means has a normal unstressed length measured along a line parallel to the centerline of the first cylindrical portion. The nut means is positioned on the elongate cylindrical member extending outwardly from the second portion of the buffer means and compresses the buffer means against the plate portion along an axis generally parallel to the centerline of the eccentric aperture. The compression of the buffer means along the axis causes the length of the compressed buffer means to be less than the normal unstressed length thereof; causes at least a portion of the outer cylindrical surface of the first cylindrical portion of the buffer means to be outwardly forced against the circular opening in the plate portion to produce frictional forces which resist rotation of the buffer means in the circular opening; causes at least a portion of the cylindrical surface of the eccentric aperture in the buffer means to be forced against the elongate cylindrical member to produce frictional forces which resist rotation of the buffer means in the circular opening; and, causes the second portion of the buffer means to be compressed against one of the front and back sides of the plate portion. The compressed length of the buffer means is five to thirty percent less than the normal unstressed length of the buffer means.

In another embodiment of my invention, I provide an improved method for assembling load bearing components in a vehicle. The load bearing components include a first load bearing member having a plate portion including a front side, a back side opposed to and spaced apart from the front side, and a circular opening extending through the plate portion and spanning the distance between the front and back sides; a second load bearing member; resilient buffer means; and, elongate bolt means for assembling the first and second load bearing members and the buffer means. The resilient buffer means includes a first cylindrical portion sized to be slidably rotably inserted in the circular opening and having a centerline parallel to and equidistant from points on the outer cylindrical surface thereof; a second portion attached to the first cylindrical portion and sized to bear against one of the front and back sides of the plate portion without passing through the circular opening; and, an eccentric cylindrical aperture extending through the first and second portions and having a centerline parallel to the cylindrical surface of the aperture and to the centerline of the cylindrical portion. The buffer means has a normal unstressed length measured along a line parallel to the centerline of the first cylindrical portion. The elongate bolt means includes an elongate cylindrical member sized to be slidably inserted in and extend through the eccentric aperture such that a portion of the elongate cylindrical member extends outwardly from the second portion of the buffer member; and, nut means to fixedly removably engage the elongate cylindrical member and bear against the second portion of the buffer means. The improved method includes the steps of slidably inserting the second portion of the buffer means in the circular opening; slidably inserting the elongate cylindrical member in the eccentric aperture such that a portion of the elongate cylindrical member extends outwardly from the second portion of the buffer member; and, engaging the elongate cylindrical member with the nut means to bear against and compress the resilient buffer means against the plate along an axis generally parallel to the centerline of the eccentric aperture. The compression of the buffer means along the axis causes the length of the compressed buffer means to be less than the normal unstressed length; causes at least a portion of the outer cylindrical surface of the first cylindrical portion of the buffer means to be outwardly resiliently compressed against the circular opening of the plate portion to produce frictional forces which resist rotation of the buffer means in the circular opening; causes at least a portion of the cylindrical surface of the eccentric aperture in the buffer means to inwardly resiliently compress against the elongate cylindrical member to produce frictional forces which resist rotation of the buffer means in the circular opening; and, causes the second portion of the buffer means to be compressed against one of the front and back sides of the plate portion. The compressed length of the buffer means is five to thirty percent less than the normal unstressed length of the buffer means. The first and second load bearing components can comprise suspension components in a vehicle. After the elongate cylindrical member is inserted in the eccentric aperture, the buffer means can be rotated to move the elongate cylindrical member to a desired position in the circular opening and adjust the orientation of the first and second load bearing members with respect to one another.

Turning now to the drawings, which depict the presently preferred embodiments of the invention for the purpose of illustrating the practice thereof and not by way of limitation of the scope of the invention, and in which like reference characters represents corresponding elements throughout the several views, FIG. 1 illustrates a front suspension assembly of the general type utilized in 1971-1986 Ford F-250 and 350 and on 1981-1986 Ford F-150 pickup trucks. The suspension system includes a first load bearing member or axle 11 having an outer end 12 with apertures 13, 14 which receive ball joints 15, 17 securing wheel spindle unit 18 to the outer end 12 of axle 11. Spindle unit 18 rotatably carries wheel 19. Second load bearing member or radius arm 20 includes threaded cylindrical distal end 21 which passes through aperture 22 of radius arm bracket 23. Third load bearing member or radius arm bracket 23 is, as illustrated in FIG. 2, removably secured to frame 24 of the truck by bolts 25, 26 received by internally threaded vertically oriented apertures (not shown) formed in generally horizontally oriented lower surface 25 of frame 24. Bolts 30, 31 removably secure wings 32, 33 of bracket 23 to surface 27 of frame 24. Internally threaded apertures (not visible) formed in surface 27 receive bolts 30, 31. The original equipment radius arm assembly includes members 24–26 and nut 27. Cylindrical members 24–26 each include a centered cylindrical aperture formed therethrough to receive threaded end 21 of radius arm 20. Nut 27 is threaded onto distal end 21 to draw end 21 through aperture 22 and compress members 24–26 together.

The buffer means utilized in the practice of the invention is illustrated in FIGS. 3, 4 and includes collar 40, hollow cylindrical buffer member 41, sleeve buffer member 42, washer 43 and nut 44. Collar 40, washer 43 and nut 44 are preferably fabricated from steel, aluminum or some other substantially rigid material. Aperture 45 is formed through cap 40. Eccentric aperture 46 is formed through top 47 of cap 41. Buffer member 42 is solid except for the eccentric cylindrical aperture 48 is generally parallel to the centerline of cylindrical member 42. Aperture 50 is forced through washer 43. Internally threaded aperture 51 is formed through nut 44. The diameter of inner cylindrical surface 60 is larger than the outer diameter of cylindrical portion 61 of member 42 such that surface 60 can receive portion 61. The outer diameter of cylindrical portion 61 of buffer member 42 is also slightly less than the inner diameter of aperture 22 formed in radius arm bracket 23 such that aperture 22 slidably rotably receives portion 61 of buffer member 42. The outer diameter of cylindrical neck 73 is greater than the diameter of aperture 22. The outer diameter of cylindrical neck 74 of cap 41 is also greater than the diameter of aperture 22 of bracket 23.

In FIG. 4, wedge 52 tapers from end 53 to end 54 and includes elongate slots 55, 56 formed therethrough. The longitudinal centerlines of slots 55, 56 are generally parallel to centerline 57 of upper planar face 58 of wedge 52. The angle between upper planar face 58 and wedge 52 and lower planar face 59 is indicated by arrows B.

FIG. 2 illustrates the buffer means of the invention installed on the radius arm 20 and radius arm bracket 23 of a Ford pickup truck. In FIG. 2, end 21 of radius arm 20 passes through apertures 45, 46, 48, 50 and 51 of collar 40, buffer member 41, buffer member 42, washer 43 and nut 44, respectively. Inner circular surface 79 of member 42 bears against planar face 75 of bracket 23. Circular surface 76 of member 41 bears against planar surface 76A of bracket 23. Face 75 and surface 76A are generally parallel to one another. Nut 44 is threaded onto distal end 21 to draw end 21 through apertures 45, 46, 48 and 50 and force collar 40 against circular neck 72 of radius arm 20, to compress collar 40 and member 41 between neck 72 and face 76, and to compress member 42 and washer 43 between nut 44 and face 75. In FIG. 2, wedge 52 has been installed between generally horizontally oriented planar member 80 of radius arm bracket 52 to downwardly displace radius arm bracket 23 and distal end 21 of arm 20 in the direction of arrow C. If nut 44 is, in FIG. 2, loosened, then member 42 can be manually rotated in the direction of arrows A to raise or lower distal end 21 in the directions of arrows D and C, respectively. Raising arm 20 in the direction of arrow D decreases caster while lowering arm 20 in the direction of arrow C increases the castor of the wheel 19 operatively associated with arm 20.

In the method of the invention the amount of castor adjustment required is determined and the original bushing components 24, 25, 26 and 27 are then removed from the distal end 21 of radius arm 20 and set aside. As is appreciated by those of skill in the art, the original bushing components can be removed by removing nut 27, by removing bolts 30, 31 25 and 26 securing bracket 23 to frame 24, and by pulling bracket 23 and the remaining bushing components 24–26 from arm 20 in the direction of arrow E in FIG. 2. The original bushing components 24–27 can also be removed from arm 20 by removing nut 27, "dropping" the front axle, and pulling arm 20 in the direction of arrow F to pull distal end 21 through aperture 22 and away from bracket 23. While distal end 21 is being pulled through aperture 22 and away from bracket 23, bushing components 24–26 can be pulled off of distal end 21. When the front axle is "dropped" in order to remove bushing components 24–26 from distal end 21, bracket 23 can need not be separated from frame 24.

If original bushing components 24–27 are removed from arm 20 by removing bracket 23 from the frame 24 and pulling bracket 23 from the frame 24 and pulling bracket 23 and components 24–26 from end 21 in the direction of arrow E, then the buffer means of the invention is installed as follows. Collar 40 and member 41 are slid onto end 21 in the direction of arrow F and in the orientation illustrated in FIGS. 2 and 3. Aperture 22 of bracket 23 is slid over end 21 of arm 20 such that bracket 23 is generally in the orientation shown in FIG. 2. Buffer member 42 and washer 43 are slid over distal end 21 in the orientation illustrated in FIGS. 2 and 3 and nut 44 is loosely threaded onto distal end 21. If the amount of castor adjustment of wheel 19 requires utilization of the wedge 52, then wedge 52 is inserted between member 80 and frame 24 as illustrated in FIG. 2 and bolts 25, 26 are inserted and loosely threaded into frame 24. Bolts 25, 26 pass through apertures 56, 55, respectively, of wedge 52. After wedge 52 is loosely interposed between member 80 and frame 24, elongate grooves 55, 56 permit wedge 52 to be slid in the directions indicated by arrows G and H. Sliding wedge 52 in the direction of arrow G permits member 80 to be tightened with bolts 25, 26 to a position nearer frame 24, and, consequently, decreases the castor of wheel 19 associated with arm 20. Sliding wedge 52 in the direction of arrow H increases the distance of member 80 from surface 25 of frame 24 and increases the castor of the wheel 19. In FIG. 2, though not visible, cylindrical portion 61 of buffer member 42 extends through aperture 22 of bracket 23. Eccentric aperture 48 permits the position of distal end 21 to be vertically displaced in the directions of arrows C and D by simply manually rotating member 42 in the directions indicated by arrows A in FIGS. 2 and 3. The desired position of arm 20 is therefore achieved by rotating member 42, and, if wedge 52 is installed, by displacing wedge 52 in the directions of arrow G or arrow H. In certain cases, the necessary amount of caster adjustment can be obtained by installing only wedge 52 or the buffer means bushing assembly of FIG. 3. However, in many cases, it is desirable and necessary to install both wedge 52 and the buffer means of FIG. 3 in the manner shown in FIG. 2.

When, in FIG. 2, nut 44 is slightly loosened and buffer member 42 is manually rotated in the directions indicated by arrows A, cylindrical portion 61 extending through aperture 22 of bracket 23 contacts and rotates in aperture 22.

As would be appreciated by those of skill in the art, when wedge 52 is installed intermediate bracket 23 and frame 24 in the manner shown in FIG. 2, then new holes must be drilled in wings 32, 33 before bolts 30, 31 can be installed through wings 32, 33 and into the apertures formed in frame 24 to receive bolts 30, 31.

While the suspension on which the method of the invention is utilized is described herein as front suspension for Ford pickup trucks, similar suspensions can be used for the rear wheels of a vehicle. Consequently, the method and apparatus of the invention could, if appropriate, be utilized to adjust the castor of the rear wheels of a vehicle.

In FIG. 5, buffer member 41 has been modified to include conical surface 81 tapering inwardly from cylindrical surface 60 toward aperture 46 and cylindrical surface 82. Circular conical rim 83 extends outwardly from surface 76A of bracket 23. Rim 83 is inwardly canted and tapers toward centerline 83A. When buffer member 41 is installed on end 21 in the manner illustrated in FIGS. 2 and 6, outer surface 87 of rim 83 bears against and frictionally engages conical surface 81, helping to prevent member 41 from rotating about metal end 21 after member 41 has been tightened in position by turning nut 44 along end 21 toward tapered surface 20A of arm 20. Edge 88 of rim 83 can also bear against and frictionally engage surface 81.

As shown in FIG. 6, when nut 44 is turned along metal end 21 toward surface 20A, surface 79 of buffer member 42 is forced in the direction of arrows J against surface 75 of bracket 23. Nut 44 is tightened an amount sufficient to compress member 42 an amount equal to 5 to 30% of its normal unstressed length indicated by arrows 84. Tightening nut 44 along end 21 generates compressive forces on the central portion of member 42 which are generally parallel to axis 86. In FIG. 6, axis 86 corresponds to the centerline of end 21 and arm 20. Compressing the central area of member 42 in a direction along axis 86 causes the outer cylindrical surface of portion 61 to be sealingly compressed against aperture 22, and also causes portion of aperture 48 to be sealingly compressed against end 21. Conical surface 81 is forced against rim 83 and surface 76 is forced against surface 76A when nut 44 is tightened against member 42. Portions of aperture 46 are also forced against end 21. The normal unstressed length, indicated by arrows 85, of buffer member 41 is compressed or shortened 5 to 30%, preferably by 10 to 20%, when nut 44 is tightened against member 42.

An alternate embodiment of wedge 52 is depicted in FIG. 7 and includes ends 93 and 94 and elongate slots 95 and 96 formed therethrough. The longitudinal centerlines of slots 95, 96 are generally parallel to centerline 97 of upper planar face 98 of wedge 92. The angle between upper planar face 98 of wedge 92 and lower planar face 99 is indicated by arrows B. The distance between any pair of adjacent lugs 100 is equal to the distance between any other pair of adjacent lugs. Lugs 100 enable an individual to readily determine the amount by which the caster has been adjusted when wedge 92 is inserted in the manner shown in FIG. 2. Arrows 101 in FIG. 7 indicate the distance between the centerlines of an adjacent pair of lugs 100. When wedge 92 is inserted in the manner shown in FIG. 2 and is then moved in the direction of arrow G or arrow H a distance equal to that indicated by arrows 101, the castor is adjusted by a particular amount. Wedge 92 is presently shaped and dimensioned such that displacing wedge 92 a distance equal to the indicated by arrows 101 adjusts castor by 0.125 degrees.

FIGS. 8 to 11 illustrate an independent rear suspension of the type found in Ford Tempo or Topaz automobiles. The suspension includes control arms 102 and 103, tie rod 104, spindle 105, MacPherson strut 106, and frame 107. Each control arm 102 and 103 has a first end 108 and a second end 109 with a cylindrical opening 110 formed therethrough. Factory equipped Ford automobiles include an O-shaped rubber member 111 and O-shaped metal ring 112. A nut 114 (not visible in FIG. 8) and bolt 113 secure end 108 to frame 107. Buffer members 117 each include a first cylindrical portion sized to be slidably received by an aperture 110 formed in an end 108, 109 of a control arm 102, 103. When portion 118 of buffer member 117 is inserted in an aperture 110, the centerline 119 of portion 118 is generally colinear with the centerline of cylindrical aperture 110. In FIG. 9 dashed line 120A is the centerline of aperture 110. Buffer means 117 also includes a second cylindrical top portion 120 attached to the first cylindrical portion and including surfaces 121 and 125. Eccentric cylindrical aperture 122 extends through portions 118 and 120. The centerline 123 of aperture 122 is spaced apart from and parallel to centerline 119 of portions 118 and 120. Portion 118 includes lower circular surface 124. Aperture 112 is sized to slidably receive a bolt 115. When portion 118 of buffer member 117 is slidably inserted in an aperture 110 in the manner shown in FIGS. 8, 10 and 11, member 117 can, prior to the tightening of a nut 116 on a bolt 115 passing through member 117, be readily manually rotated in cylindrical aperture 110 in the directions of arrows N to adjust the position of eccentric aperture 122 in aperture 110.

The suspension assembly of FIGS. 8, 10 and 11 includes brackets 126 having planar surfaces 127 and 128. Circular opening 129 extends through bracket 126 and spans the distance between surfaces 127, 128. Opening 129 is sized to receive a bolt 113, 115.

In FIG. 8, ends 109 of control arms 102 and 103 are equipped with the buffer means 117 of the invention while ends 108 of metal arms 102 and 103 are shown equipped with conventional rubber member 111 and ring 112 provided by the vehicle manufacturer. Buffer means 117 is installed in an end 108, 109 of a conventional control arm by loosening and removing the bolts holding the end 108, 109 of the control arm to frame 107 or bracket 126 and by then removing the ring 112 and member 111 from aperture 110 in the end of the arm 102, 103. Portion 118 of buffer means 117 is slidably inserted in aperture 110. A bolt 113, 115 is utilized to loosely secure buffer means 117 and the end 108, 109 of arm 102, 103 to the frame 107 or bracket 126 in the manner illustrated in FIGS. 8, 10 and 11. After an end 108, 109 is loosely secured to a bracket 126, portion 120 of buffer means 117 is manually grasped and rotated to turn aperture 122 to the desired position in aperture 110. Once aperture 122 is in the desired position, nut 114, 116 is tightened on bolt 113 or 115 to compress buffer means 117 securely in position in aperture 110 and against end 108 and bracket 126.

In FIG. 11 the normal unstressed length of buffer means 117 is indicated by arrows 130. When nut 116 is tightened on bolt 115, surface 125 is displaced in the direction of arrows P, the outer cylindrical surface of portion 118 is sealingly compressed in the direction of arrows Q against cylindrical aperture 110, surface 124 is sealingly compressed against surface 127, and surface 121 is sealingly compressed against end 109. Nut 116 is tightened on bolt 115 an amount sufficient to reduce the length of buffer means 117 by an amount equal to 5 to 30%, preferably 10 to 20%, of the unstressed length indicated by arrows 130 in FIG. 11. Tightening nut 116 on bolt 115 causes the head of bolt 115 to generate compressive forces on the central portion of means 117 which are generally parallel to axis 132.

Buffer means 117 can, after member 111 and ring 112 are removed, be installed in aperture 110 in either or both ends of each arm 102, 103 in FIG. 8. As would be appreciated by those of skill in the art, once buffer means 117 are installed in apertures 110 of arms 102, 103, each buffer means 117 can, prior to tightening the bolt passing through the means 117, be rotated in aperture 110 to adjust the camber, toe-in and thrust line of spindle 105. For example, if buffer means 117 are installed in each aperture 110 in arm 102 in FIG. 8, means 117 can both be rotated to displace arm 102 in the direction of arrow R and alter the toe-in of spindle 105. Simply rotating only buffer means 117 in aperture 110 of end 109 of arm 102 alters the toe-in and camber of spindle 105. Rotating buffer means 117 installed in each aperture 110 in ends 109 of arms 102 and 103 adjusts the camber of spindle 105.

The material utilized to fabricate buffer members 41, 42 and buffer means 117 must maintain its resilience under compression when used in conjunction with dynamic load components which either transmit vibration to the buffer members 41, 42 and buffer means 117 or which move with respect to one another during operation of the machine containing the load bearing components. Buffer members 41, 42 and buffer means 117 compressively sealingly frictionally engage load bearing components and prevent corrosion and degradation of the components due to galvanic corrosion and due to the absorption of water or other fluids by the buffers. The material utilized to fabricate buffer members 41, 42 and means 117 shuld exhibit minimal plastic deformation after the removal of an applied stress; exhibit fatigue resistance; resist the absorption of water; be resilient; and, have an elastic modulus, loss modulus and tangent delta which enable the material to absorb energy during movement the dynamic load bearing components with respect to one another. The physical characteristics of the material utilized in the buffer members 41, 42 and means 117 are summarized in the following tables:

TABLE I

Moduli of Buffer Material

| Property | ASTM Test Method | Test Temp °F. (°C.) | Range (PSI) | Preferred Range (PSI) |
|---|---|---|---|---|
| 100% Modulus | D412 or D638 | 77 (25) | 340–1,450 | 1,250–1,450 |
| Flexural Modulus | D790* | 73 (23) | 2,680–50,280 | 20,360–50,280 |
| Loss Modulus, E" | ** | 68 | 100–1,400 | 1,000–1,300 |
| Tensile Elastic Modulus, E' | ** | 68 | 3,333–46,666 | 30,000–43,333 |

*0.5 in/min., secant modulus, 1%
**Measurements made with Rheovibron ® viscoelastmometer at a frequency of 11 Hz.

The basic parameters for assessing the vibrational properties of a material are the elastic modulus (E'), loss modulus (E") and tangent delta. E' is a direct measure of the pure elasticity (Hook's law behavior) of a material. E" is a measure of the viscous or hysteresis properties (conversion of mechanical to heat energy) of a material. An energy absorbing material typically has a large E" and tangent delta.

$$Tangent\ Delta = E''/E' \qquad [1]$$

The modulus, E, of a material is determined from the eastlic and loss moduli:

$$E = [(E')^2 + (E'')^2]^{\frac{1}{2}} \qquad [2]$$

TABLE II

Fluid Resistance of Buffer Material*

| Fluid | Test Time (hrs) | Test Temp °C. | % Volume Swell Range | Preferred % Volume Swell Range |
|---|---|---|---|---|
| Water | 166 | 100 | 1–8 | 1–3 |
| 15% NaCl | 166 | 23 | 0 | 0 |
| ASTM #1 Oil | 166 | 100 | 1–30 | 5–10 |
| 20% Sulfuric Acid | 166 | 23 | 0 | 0 |

*ASTM D471

TABLE III

Resilience of Buffer Materal

| Test | Range | Preferred Range |
|---|---|---|
| 1st Lupke Rebound | 55–75 | 55–65 |
| 1st Bashore Rebound (%) | 15–35 | 15–25 |

TABLE IV

Fatigue Resistance of Buffer Material*

| Size of initial Cut | Cycles of Flexing Before Failure | Preferred Cycles of Flexing Before Failure |
|---|---|---|
| 0.1 inch | 100,000 to 2,000,000 | No failure after 1,000,000 cycles completed |

TABLE V

Compression Set of Buffer Material*

| Test Temp °F. (°C.) | Test Time (Aging Time) (hrs) | Percent Set | Preferred Percent Set |
|---|---|---|---|
| 73 (23) | 100 | 18–43 | 30–43 |

*ASTM D395, method B, 25% deflection, 0.47 in. guage thickness.

TABLE VI

Dielectric Constant of Buffer Material*

| Test Temp °F. (°C.) | Voltage Gradient Volts/Mil | Power Factor Percent | Dielectric Constant |
|---|---|---|---|
| 73 (23) | 40 | 0.10–1.00 | 2.5–3.5 |

*While dielectric constants less than 5.0 are acceptable, a constant of less than 3.5 is preferred.

The resilience and resistance to compressive set of the buffer material are important in the practice of the invention because the buffer material must be capable of being loosely inserted between dynamic load bearing components and displaced to adjust the position of the components with respect to one another. After the buffer material is displaced to adjust the position of the load bearing components it must be capable of being compressed in a first direction to outwardly force a surface of the buffer material against at least one of the load bearing components in a direction generally perpendicular to the first direction to frictionally maintain the material in position against the load bearing member. Further, after the buffer material is compressed it must, in order to continue to be frictionally forced against one of the load bearing members, retain its resilience. Conventional materials such as metals, neoprene, EPDM and chlorosulfonated polyethylene are not preferred in the practice of the invention. Neoprene, EPDM and chlorosulfanted polyethylene rapidly fail under cyclical stress when there is a small tear or cut in the material. Santoprene thermoplastic rubbers or other materials with the properties enumerated above are preferred in the practice of the invention.

Wedge 52 has a water absorption of less than 1.1 percent of the weight of the wedge over a twenty-four hour period of time, has a coefficient of thermal expansion less than $2.7 \times 10^{-5}$ in./in./°F., and has a dielectric constant at 100 HZ less than 5.0.

In FIG. 10 indicia 150 are formed at equal intervals along the periphery of circular surface 125. Surface 125 is sized such that when means 117 is rotated in aperture 110 through an arc equal to the distance between a pair of adjacent indicia 150, the toe-in or camber of spindle 105 is adjusted by a certain selected amount. Consequently, the utlization of indicia on or the shaping of portion 120 to indicate the distance portion 120 has been rotated can facilitate an individual in determining how much the camber or toe-in of spindle 105 is adjusted.

Having described my invention in such terms as to enable those skilled in the art to understand and practice it, and having identified the presently preferred embodiments thereof, I claim:

1. An adjustable load bearing assembly in a vehicle including
   (a) spindle means for rotatably carrying a wheel;
   (b) a first load bearing member having a plate portion including
      (i) a front side
      (ii) a back side opposed to and spaced apart from said front side, and
      (iii) a circular opening extending through said plate portion and spanning the distance between said front and back sides;
   (c) a second load bearing member including a radius arm attached to said spindle means;
   (d) elongate bolt means extending through said circular opening in said first load bearing member and
      (i) interconnecting said radius arm and said first load bearing member, and
      (ii) including an elongate cylindrical member and nut means fixedly removably engaging said elongate cylindrical member;
   (e) resilient buffer means including
      (i) a first resilient cylindrical portion slidably rotatably inserted in said circular opening and having a centerline parallel to and equidistant from points on the outer cylindrical surface thereof,
      (ii) a second portion attached to said first cylindrical portion and bearing against one of said front and back sides of plate portion, and
      (iii) an eccentric cylindrical aperture extending through said first and second portions and having a centerline parallel to the cylindrical surface of said aperture and to said centerline of said cylindrical portion, said elongate cylindrical member of said bolt means being slidably inserted in and extending through said eccentric aperture and outwardly from said second portion of said buffer means, the rotation of said buffer means displacing said cylindrical member and said radius arm to adjust the caster of said spindle means,
      said buffer means having a normal unstressed length measured along a line parallel to said centerline of said first cylindrical portion,
      said nut means being positioned on said cylindrical member extending outwardly from said second portion to bear against and compress said resilient buffer means against said plate portion in a direction generally parallel to said centerline of said eccentric aperture, said compression of said buffer means in said direction fixing the position of said buffer means with respect to said plate and causing
   (f) said length of said compressed buffer means to be less than said normal unstressed length;
   (g) at least a portion of said outer cylindrical surface of said first cylindrical portion of said buffer means to be outwardly sealingly compressively forced against said circular opening in said plate portion to produce frictional forces which resist rotation of said buffer means in said circular opening;
   (h) at least a portion of said cylindrical surface of said eccentric aperture in said buffer means to be forced against said elongate cylindrical member to produce frictional forces which resist rotation of said buffer means in said circular opening; and
   (i) said second portion to be compressed against one of said front and back sides of said plate portion to produce frictional forces which resist rotation of said buffer means in said circular opening.

2. The load bearing assembly of claim 1 wherein said compressed length of said buffer means is twenty to thirty-five percent less than said normal unstressed length of said buffer means.

3. A method for adjusting load bearing components in the suspension of a vehicle, said load bearing components including
   spindle means for rotatably carrying a wheel,
   a first dynamic load bearing control arm having a plate portion including
      a front side
      a back side opposed to and spaced apart from said front side, and
      a circular opening extending through said plate portion and spanning the distance between said front and back sides;
   a second dynamic load bearing member connected to said spindle means and having a primary aperture formed therethrough;
   resilient buffer means including
      a first cylindrical portion sized to be slidably rotatably inserted in said circular opening and having a centerline parallel to and equidistant from points on the outer cylindrical surface thereof,
      a second portion attached to said first cylindrical portion and sized to bear against one of said front and back sides of said plate portion without passing through said circular opening, and
      a eccentric cylindrical aperture extending through said first and second portions and having a centerline parallel to the cylindrical surface of said aperture and to said centerline of said cylindrical portion, said buffer means having a normal unstressed length measured along a line parallel to said centerline of said first portion, elongate bolt means for assembling said control arm, said second load bearing member and said buffer means, said bolt means including an elongate cylindrical member sized to be slidably inserted in and extend through said primary aperture and said eccentric aperture such that a portion of said elongate cylindrical member extends outwardly from said second portion of said buffer member, and nut means to fixedly removably engage said elongate cylindrical member and bear against said second portion of said buffer means, said method comprising the steps of (a) slidably inserting said second portion of said buffer means in said circular opening;

(b) slidably inserting said elongate cylindrical member through said primary aperture and said eccentric aperture such that a portion of said elongate cylindrical member extends outwardly from said second portion of said buffer means;

(c) rotating said buffer means in said circular opening to move said eccentric aperture and said elongate cylindrical member to a desired position in said opening, said movement of said eccentric aperture to a desired position in said opening altering the orientation of said control arm and said second load bearing member with respect to one another to adjust at least one of the camber and toe-in of said spindle means;

(d) engaging said elongate cylindrical member with said nut means to bear against and compress said resilient buffer means against said plate in a direction generally parallel to said centerline of said eccentric aperture, said compression of said buffer means in said direction causing (i) said length of said compressed buffer means to be less than said normal unstressed length, (ii) at least a portion of said outer cylindrical surface of said first cylindrical portion of said buffer means to be outwardly resiliently sealingly compressed against said circular opening in said plate portion to produce frictional forces which resist rotation of said buffer means in said circular opening;

(iii) at least a portion of said cylindrical surface of said eccentric aperture in said buffer means to be inwardly resiliently compressed against said elongate cylindrical member to produce frictional forces which resist rotation of said buffer means in said circular opening; and, (iv) said second portion of said buffer means to be compressed against one of said front and back sides of said plate portion.

4. The method of claim 3 wherein said compressed length of said buffer means is twenty to thirty five percent less than said normal unstressed length of said buffer means.

5. The method of claim 4 wherein said buffer means is generally comprised of a material composition having a compression set in the range of 18 to 43% after 100 hours aging time at 73° F. under ASTM D395, method B, 25% deflection, 0.47 inch gauge thickness, a dielectric constant of less than 5.0 at a voltage gradient of 40 volts/mil at 73° F., a resilience generally equivalent to a first rebound in the range of 15 to 35% in the Bashore test, a water resistance generally equivalent to a percent volume swell in the range of 0.5 to 8.0 percent after 166 hours immersion in water 100° C., and a loss modulus, $E''$, in the range of 100 to 1,400 at 68° F.

* * * * *